United States Patent [19]

Ray et al.

[11] Patent Number: 4,641,454

[45] Date of Patent: Feb. 10, 1987

[54] PROTECTIVE SOCK FOR ROD AND REEL

[76] Inventors: Douglas M. Ray, 7416 NE. 69th St., Vancouver, Wash. 98662; Richard H. Weihl, 6209 NE. 70th St., Vancouver, Wash. 98661

[21] Appl. No.: 764,086

[22] Filed: Aug. 9, 1985

[51] Int. Cl.⁴ ............................................. A01K 97/08
[52] U.S. Cl. ........................................ 43/26; 24/442; 224/901
[58] Field of Search ................... 43/26, 25; 24/442; 224/901

[56] References Cited

U.S. PATENT DOCUMENTS

| | | | |
|---|---|---|---|
| 1,676,592 | 7/1928 | White | 43/26 |
| 2,149,087 | 2/1939 | Fisher | 43/26 |
| 2,618,880 | 11/1952 | Sourek | 43/26 |
| 2,869,277 | 1/1959 | Breithaupt | 43/26 |
| 3,674,190 | 7/1972 | Wright | 43/26 |
| 4,024,997 | 5/1977 | Kolpin | 224/901 |
| 4,136,478 | 1/1979 | Wycosky | 43/26 |
| 4,548,249 | 10/1985 | Slaughterbeck | 224/901 |

FOREIGN PATENT DOCUMENTS 2396506 3/1979 France ................................. 43/26

Primary Examiner—Gene P. Crosby
Attorney, Agent, or Firm—Chernoff, Vilhauer, McClung & Stenzel

[57] ABSTRACT

A protective sock for a fishing reel fits over a bundle comprising the segmented rod sections and the attached reel. The sock includes a waterproof outer sleeve joined to a soft inner sleeve of non-abrasive padded material. Constricting tapes which may be closed by a closure of the hook-and-loop variety are sewn into the outer sleeve at either end so that the sock may be fastened about the bundle enclosing the reel within.

5 Claims, 4 Drawing Figures

PROTECTIVE SOCK FOR ROD AND REEL

BACKGROUND OF THE INVENTION

The following invention relates to a protective sock for enclosing a fishing reel mounted on a fishing rod.

Fishing tackle including a segmented rod and a handle-mounted reel is awkward to transport because such rods are generally too long to be broken down into convenient lengths, and because most fishermen tend to leave the fishing reel attached to the handle end of the rod. Thus, a rod and reel combination is usually carried as at least three, and sometimes four, segments of rod together with the handle-mounted reel. There presently exists no convenient means of carrying this bundle of pieces. In order to keep the rod segments together some fishermen resort to rubber bands while others use small metal twist ties. This enables the rod and reel combination to be disassembled and carried more or less as a shorter unit, but is awkward and requires keeping track of the small constricting parts.

Another problem in transporting a rod and reel combination this way is that the reel mechanism may become damaged or jammed by dirt and foreign objects or corroded by salt water which can enter and clog the reel mechanism. A desirable object would be to provide a means for holding the reel and disassembled rod combination together as a conveniently transportable package and at the same time keeping the reel mechanism safe from damage occasioned by dirt, foreign objects or salt water.

SUMMARY OF THE INVENTION

The present invention provides means for accomplishing the above objectives by providing a protective sock for enclosing the fishing reel while attached to a fishing rod handle. The sock is sufficiently large to enclose a bundle comprising the other segments of the fishing rod together with the attached fishing reel. The sock may include a sleeve constructed of a layer of waterproof material on the outside and have an inner layer of softer material which may include padding. At either end of the sleeve there are constricting tapes or bands having a hook-and-loop closure for enclosing the ends of the sleeve snugly about the bundle.

An optional feature may include a selectively openable pocket in the outer layer of the waterproof material. This might be used to carry accessories such as small tools, floats, sinkers or lures.

The hook-and-loop closure consists of pairs of tabs affixed to opposite ends of constricting tapes located at either end of the sleeve. The pairs of tapes have lengths sufficient to enclose the bundle of rod segments and attach to each other thereby encircling the bundle with the sleeve material bunched around the bundle at either end. For larger reels, such as salt water fishing reels, the sleeve need not be entirely cylindrical but may have a larger diameter in the center of the sleeve than at either end thereby facilitating the closure of the sleeve about the larger-sized reel.

A principal object of this invention is to provide a protective sock for protecting and facilitating the transport of a segmented fishing rod with an attached fishing reel.

A further object of this invention is to provide a protective covering for a fishing reel which may be easily removed when the rod and reel combination is to be used.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
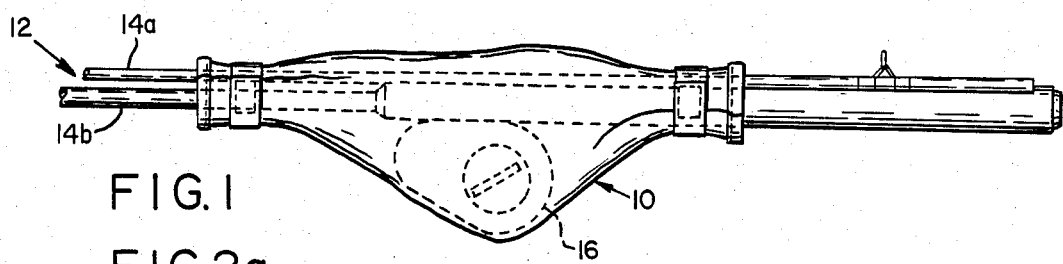
FIG. 1 is a side view of the protective sock enclosed about a rod bundle showing a reel attached to the handle end of the rod in phantom outline.

A protective sock for a rod and reel combination 10 is constructed so as to enclose a bundle 12 formed by rod segments 14a and 14b. A fishing reel 16 shown in phantom outline is enclosed within the sock 10 and is attached to rod handle end 14b. The sock comprises a substantially cylindrical sleeve 18 which is formed of an outer layer 20 of substantially waterproof material. An appropriate material which will resist wear as well as provide water repellency is 100% waterproof nylon. The sleeve 18 also includes an inner layer of material 22 which is soft and nonabrasive. Padding 24 may be included between the outer layer 20 and the inner layer 22. For example, polyester-filled Concord quilt manufactured by Concord Fabric Co. and consisting of 50% polyester and 50% cotton may be used for the inner layer 22 and at the same time provide the necessary padding 24. A two and one-half ounce weight is preferred, but if more protection needs to be provided for the reel, heavier weights which include more polyester filling and therefore greater padding are acceptable. The outer layer 20 may include a pocket 26 for the storage of small accessory items. The pocket may be selectively openable by a zipper 28 and the zipper may be protected from dirt and foreign objects by a sewn cover 30.

A pair of constricting tapes 32 and 34 are stitched into a seam of the outer layer 20 at each end of the sleeve 18. The tapes 32 and 34 include a closure of the hook-and-loop type, a common variety of which is marketed under the VELCRO TM trademark. A small rectangle of the hook material 36 may be disposed on one side of a first half 38 of closure tape 32 and the loop or pile material 40 may be sewn on the other side of a second half 42 of tape 32. The same construction is used on closure tape 34. The tapes 32 and 34 each have a length which is sufficient to form a snug constricting band for the rod bundle 12 and at the same time enclose either end of the sleeve 18. For example, the combined length of tape halves 38 and 42 may be slightly longer than the width of the sock 10 when laid out flat.

Figure 2A:
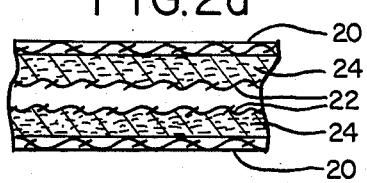
FIG. 2a is a side cutaway view of a portion of the protective sock of FIG. 2 showing its internal construction.
Figure 2:
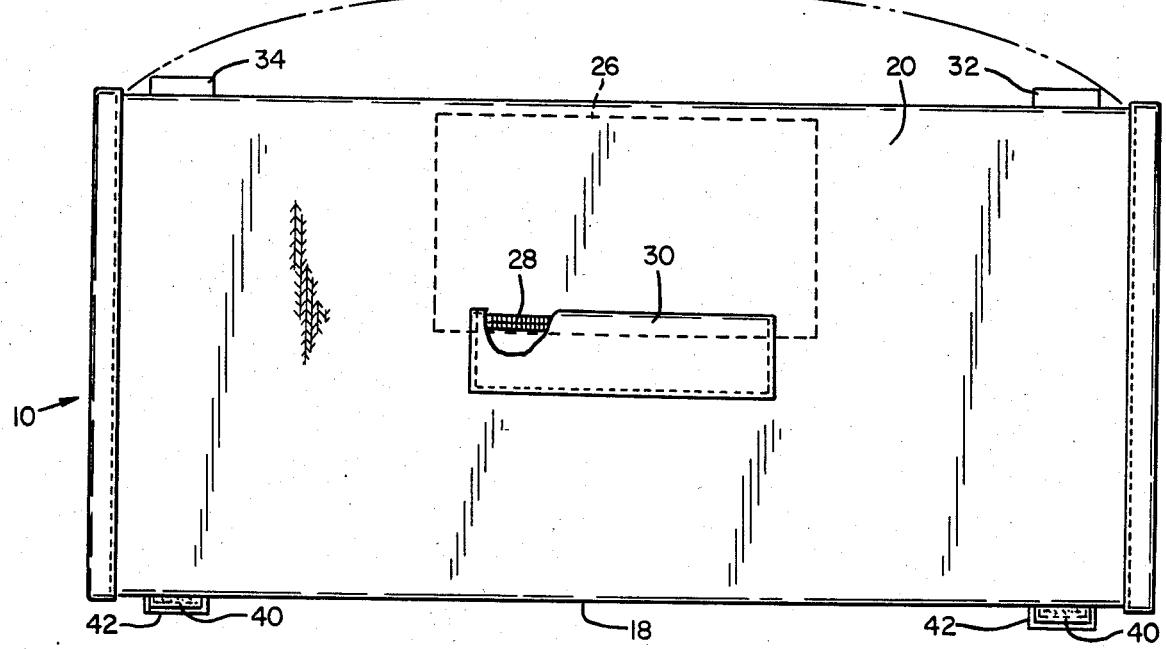
FIG. 2 is a top view of the protective sock of FIG. 1 where the sock has been laid out flat.
Figure 3:
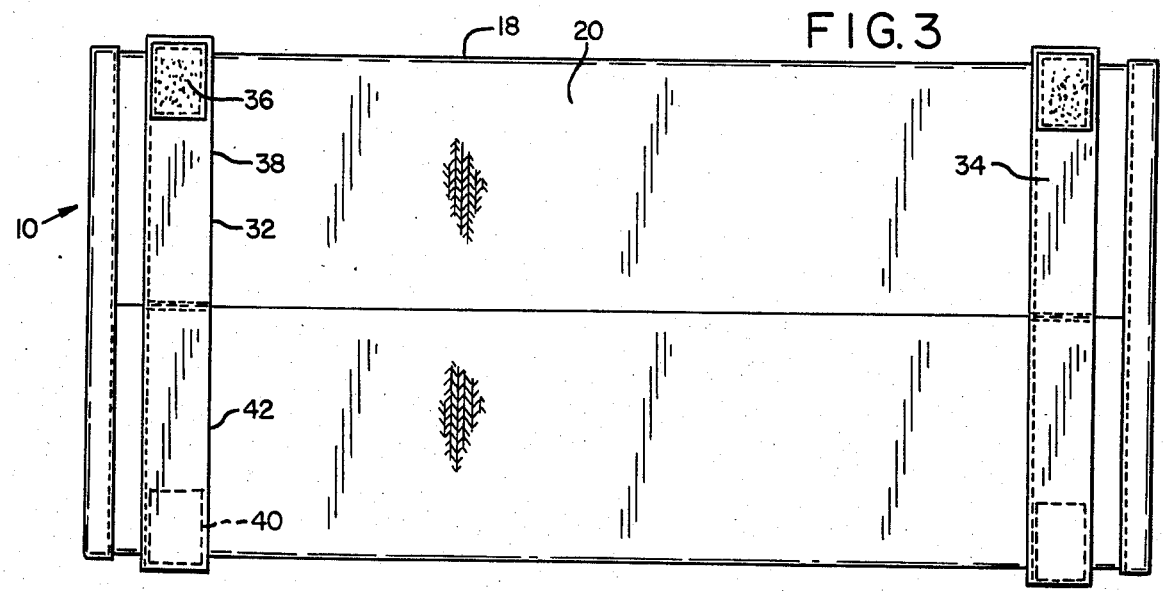
FIG. 3 is a bottom view of the sock of FIG. 2.

If desired the sock 10 may be constructed so that its diameter is larger in the center than at either end. This feature is shown in phantom outline in FIG. 2 along dotted line 44.

Alternative types of closures other than the hook-and-loop variety could be used if desired. For example, simple draw strings could be inserted through a flap in the outer layer 20 which could be drawn and tied in a knot, it being necessary, only, that the closure be permanently affixed to the sleeve 18 at either end thereof.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A protective sock for enclosing a bundle comprising a fishing reel mounted to the handle end of a fishing rod, and a plurality of rod segments, said sock comprising a substantially cylindrical sleeve having ends at least equal in diameter constructed of an outer layer of waterproof material and an inner layer of nonabrasive material, and including a pair of constricting tape means disposed at opposite ends of said cylindrical sleeve, each one of said constricting tape means having cooperatively mating closure means for closing each end snugly about said bundle, thereby enclosing the fishing reel within the sleeve.

2. The protective sock of claim 1 further including padding material inserted between the outer and inner layers of the sleeve.

3. The protective sock of claim 1 further including a selectively openable storage pocket in the outer layer of the sleeve.

4. The protective sleeve of claim 1 wherein the sleeve has a larger diameter in its center than the diameter at either end.

5. The protective sock of claim 1 wherein said closure means comprises hook and loop fasteners.

* * * * *